United States Patent [19]

Balzer

[11] Patent Number: 4,849,594

[45] Date of Patent: Jul. 18, 1989

[54] METHOD AND APPARATUS FOR SHRINK FITTING METAL LINER SLEEVES INTO INDUCTOR HEATED ENGINE CYLINDER BORES

[75] Inventor: Norbert R. Balzer, Troy, Mich.

[73] Assignee: Tocco, Inc., Boaz, Ala.

[21] Appl. No.: 245,032

[22] Filed: Sep. 16, 1988

[51] Int. Cl.4 ............................................. H05B 5/00
[52] U.S. Cl. .............................. 219/10.43; 219/10.57; 219/9.5; 266/129
[58] Field of Search ............... 219/10.57, 10.41, 10.43, 219/9.5, 10.69, 10.71; 266/129; 29/447, 446, 455 R

[56] References Cited

U.S. PATENT DOCUMENTS

| | | |
|---|---|---|
| 2,975,259 | 3/1961 | Osborn, Jr. .......................... 219/9.5 |
| 3,699,297 | 10/1972 | Grin et al. ............................. 219/9.5 |
| 4,336,432 | 6/1982 | Bajorek ............................. 219/10.41 |
| 4,574,172 | 3/1986 | Burack et al. ............... 219/10.57 X |
| 4,584,453 | 4/1986 | Fu ....................................... 219/10.43 |
| 4,659,892 | 4/1987 | Hammond et al. ............. 219/10.57 |
| 4,745,251 | 5/1988 | Vickers ............................ 219/10.57 |

Primary Examiner—Philip H. Leung
Attorney, Agent, or Firm—Body, Vickers & Daniels

[57] ABSTRACT

A method and apparatus for installing steel liner sleeves in the cylinder bores of an aluminum engine block comprises axially sliding the liner sleeves onto slide portions of respective mandrels, over an inductor coil on the free outer end of each mandrel. After axially moving the mandrels to insert their inductor coils into the cylinder bores and then energizing the coils to inductively heat the walls of the cylinder bores to a predetermined elevated temperature to expand the bores to a diameter sufficient to axially receive the liner sleeves therein with a snug sliding fit, the coils are de-energized and the liner sleeves then immediately axially slid along the mandrels to a position over the de-energized coils and within the annular coupling gap space between the coils and the bore walls, and into their axially inserted position within the heated cylinder bores, in which position they are maintained until the cylinder bore walls cool and contract to form a tight shrink fit around the liner sleeves.

51 Claims, 6 Drawing Sheets

METHOD AND APPARATUS FOR SHRINK FITTING METAL LINER SLEEVES INTO INDUCTOR HEATED ENGINE CYLINDER BORES

The present invention relates, in general, to a method and apparatus for installing metal liner sleeves in the cylindrical bores of metal bodies, such as in the cylinder bores of an engine block for instance, and more particularly to a method and apparatus for such purpose that utilizes induction heating of the bore walls in effecting the shrink fitting thereof around metal liner sleeves positioned within the bores.

BACKGROUND OF THE INVENTION

In the manufacture of aluminum engine cylinder blocks, it is customary practice to install steel liner sleeves in the cylinder bores of the engine block by inserting the liner sleeves into the bores with a snug fit therein, while the bore walls are in a heated condition, to thereby produce a tight shrink fit of the bore walls around the liner sleeves on subsequent cooling and resulting circumferential contraction of the bore walls.

In one such liner sleeve installation procedure commonly employed in the past by some aluminum engine manufacturers, the residual furnace heat retained by the engine block is utilized to establish the heated and expanded diameter condition of the cylinder bores which is essential for the shrink fitting of the cylinder bore walls around the liner sleeves. One of the problems experienced, however, with this particular manufacturing procedure utilizing the residual furnace heat retained by the engine block, is that the liner sleeves tend to be extruded out of the aluminum block bore upon cooling. While this extruding movement is not particularly great, amounting to perhaps several thousandths of an inch, it nevertheless cannot be tolerated in the finished product. It is believed this undesirable extruding movement of the liner sleeve is caused by the aluminum of the engine block cooling and shrinking onto the liner sleeve first at the bottom end of the liner sleeve and before it shrinks onto the top end thereof.

In previously known heat shrinking manufacturing procedures using induction and/or other methods of heating a metal object or body part in a bore of which a cylindrical metal sleeve is to be shrink fitted, the metal object or body part is normally heated in one manufacturing operation conducted at one processing station to the desired predetermined processing temperature and then transferred to the second or sleeve inserting operation at another processing station by a transfer operation which may not be precisely controllable timewise and involves a varying time delay such as requires a more extensive heating of the object or body part in order for it to retain sufficient heat for the necessary expansion of the object to permit the insertion into the bore thereof of the metal sleeve to be shrink fitted therein.

SUMMARY OF THE INVENTION

The present invention contemplates a new and improved method and apparatus for shrink fitting metal liner sleeves within the bores of metal bodies which overcomes all of the above referred to problems and others and provides an efficient and expeditious way of accomplishing such object with simpler handling of the metal parts and minimum energy expense.

Briefly stated, in accordance with a principal aspect of the invention, the heating of the engine block cylinder bores to their required expanded condition for liner sleeve insertion thereinto is effected by an induction heating coil, and the operation of inserting the liner sleeves into the heated bores is carried out at the same processing station at which the bores are inductively heated, without removal of the induction heating coils from the cylinder bores, thereby avoiding the need for transferring of the heated engine block to a separate liner sleeve insertion processing station along with the attendant time delay and cooling of the heated cylinder bores such as ordinarily necessitated the more extensive heating of the bore walls in order to compensate for their heat loss during such transfer operation.

According to a further aspect of the invention, axially reciprocable mandrel-like inductor units are provided onto respective ones of which the liner sleeves are preloaded, over an induction heating coil carried at the free forward end of each mandrel, to slidably position the liner sleeves on the mandrels for axial insertion into respective ones of the engine cylinder bores, on subsequent alignment of the latter with the mandrels and induction heating of the bores by the heating coils to the required predetermined elevated temperature.

According to a still further aspect of the invention, the liner sleeves are shuttled off the mandrels and axially inserted directly into the heated cylinder bores immediately upon the de-energization of the heating coils to end the heating cycle, and while the de-energized heating coils remain in place within the heated cylinder bores, thus avoiding any time delay between the end of the bore heating cycle and the liner sleeve insertion operation such as would otherwise necessitate the more extensive heating of the cylinder bores to compensate for the heat loss in the heated bore walls, with consequent added energy expense for the liner sleeve insertion operation.

According to another aspect of the invention, the heating of the cylinder bores by the induction heating coils is adapted to provide the walls of the heated bores with a temperature profile axially thereof which is modeled to compliment the particular manner of cooling of the bore walls so that the liner sleeves and the bore walls cool initially from the top down, i.e., from the outer end of the cylinder bores downward, to thereby assure the formation of a tight shrink fit of the bore walls circumferentially around the liner sleeves initially at the top ends of the bores so as to maintain the liner sleeves in the proper axial position within the respective bores.

According to a still further aspect of the invention, the trailing top end rims of the liner sleeves, on axial insertion into and while located in their proper inserted position in the cylinder bores of the engine block, are maintained in interfaced engagement with heat shrink means, which may be the same metal pressure plate such as employed to shuttle the liner sleeves into their axially inserted position within the cylinder bores, for the purpose of extracting heat from and thus cooling and contracting the outer end portions of the cylinder bore walls engaged with the trailing top end portions of the liner sleeves at a faster rate than the cooling and contracting of the remaining portions of the bore walls, to thereby produce a tight shrink fit of the bore walls onto and around the liner sleeves initially at the outer end portions of the bore walls engaged with the trailing top end portions of the liner sleeves.

According to yet another aspect of the invention, the induction heating coils have a maximum outside diameter slightly smaller than the inside diameter of the liner sleeves in order to provide a sufficient annular coupling gap or space between the walls of the bores and the heating coils when inserted thereinto to allow the cylindrical liner sleeves, on de-energization of the heating coils to terminate the bore heating cycle and while the de-energized coils remain in place in the bores, to then be axially inserted immediately into the heated bores, over and encircling the de-energized heating coils therein and into the annular space between the heated bore walls and the heating coils, to their fully inserted axial position therein.

The principal object of the invention is to provide a novel method and apparatus for expeditiously and efficiently assembling a cylindrical metal liner sleeve in predetermined axial inserted position within a cylindrical bore in a metal body member.

Another object of the invention is to provide a novel method and apparatus for shrink fitting steel liner sleeves within the cylinder bores of aluminum engine blocks which affords simpler handling of the metal parts and reduced energy costs.

Still another object of the invention is to provide an improved method and apparatus for shrink fitting steel liner sleeves within the cylinder bores of an aluminum engine block wherein the bore heating operation and the liner sleeve inserting operation are conducted at a single one work station.

A further object of the invention is to provide an improved method and apparatus for shrink fitting steel liner sleeves within the cylinder bores of an aluminum engine block which assures the fixation of each of the liner sleeves in the same predetermined axial position within the respective bores.

A still further object of the invention is to provide an improved method and apparatus for shrink fitting steel liner sleeves into the cylinder bores of aluminum engine cylinder blocks which utilizes induction heating of the bore walls and modeling of the temperature profile of the heated bores to complement the particular manner of cooling thereof so that the liner sleeves and bore walls cool and form a tight shrink fit therebetween initially at the top ends thereof acting to hold the liner sleeves fixed in place in the same predetermined axial position within the respective bores.

Further objects and advantages of the invention will be apparent from the following detailed description of preferred species thereof and from the accompanying drawings.

DESCRIPTION OF THE PREFERRED EMBODIMENTS

Referring now to the drawings wherein the showings are for the purpose of illustrating a preferred embodiment of the invention only and not for the purpose of limiting same, the figures shown an apparatus A (FIGS. 1-4) for assembling one or more metal liner sleeves 10 into a cylindrical bore 12, or into respective ones of such bores 12 in a metal body member B by an interference or so-called shrink fit. In the particular case illustrated, the apparatus A is adapted to insert and shrink fit cylindrical steel liner sleeves 10 (four as herein shown) into respective ones of a corresponding number (four) of cylinder bores 12 in an aluminum engine block B. Apparatus A, however, may be adapted to assemble or shrink fit other types of annular metal liner members 10 into annular chambers or bores 12 in other types of metal body members B. For instance, apparatus A may be adapted to shrink fit annular steel valve seat inserts or rings (not shown) into the annular valve seat counterbores (not shown) which are ordinarily provided in the intake and exhaust ports of engine cylinder blocks B. The liner sleeve insertion operation performed by apparatus A may be conveniently placed directly into existing manufacturing systems such as, for example, the conventional engine block production manufacturing lines commercially known as Lamb lines, wherein the engine block B is transferred or indexed along a slide track C and intermittently positioned at successive work stations therealong at which various processing operations are performed on the engine block. Apparatus A is shown as located at one of the work stations, i.e., a liner sleeve inserting work station L, along the slide track C.

As in commonplace in present day automotive engines, the group of cylinder bores 12 (four in the case shown) in the engine block B are disposed therein in side-by-side single row alignment, with their respective axes X extending parallel to one another in equally spaced apart relation. Also, engine block B is shown supported on the slide track C for horizontal sliding movement thereon with the bores 12 of the block disposed with their axes X extending horizontally and normal to the path of sliding movement of the block B along the track C, and with their open outer ends 14 (FIG. 3) facing toward the apparatus A when the block B is positioned at the liner sleeve inserting station L along the track C. Alternatively, the block B may be mounted on the slide track C for sliding transfer movement therealong with the axes X of their bores 12 extending vertically. In this case, the apparatus A for inserting the liner sleeves 20 into the bores 12 would be located vertically above the engine block B and the bores 12 thereof when the engine block is indexed to the liner sleeve inserting station L.

The liner sleeve inserting apparatus A according to the invention and located at the work station L along the engine block transfer line or slide track C, is comprised of a group or bank D (FIG. 2) of elongated, parallel extending, inductor units or loading heads 20 corresponding in number (i.e., four) to the bores 12 in the engine block B. The inductor units or heads 20 each comprise a generally tubular, cylindrical slide mandrel 22 of a suitable electrically insulative material such as a laminated plastic material, and having an axial center bore 24 therethrough (FIG. 3) and a center axis Y. Each inductor unit or head 20 is adapted to slidably receive thereonto a liner sleeve 10 for transfer into a respective one of the engine block bores 12 immediately following the heating of the bores at the work station L to a predetermined elevated temperature to circumferentially expand the bore wall to a diameter sufficient to slidably receive the liner sleeve axially thereinto with a sliding fit.

In the case of the particular apparatus illustrated, the elongated slide mandrels 22 comprising the bank D thereof are disposed at the work station L of the apparatus A in side-by-side parallel relation with one another, with their respective axes Y extending horizontally and spaced apart relative to one another in the same relation, i.e., equally spaced apart relation, and in the same horizontal plane P as the bores 12 of the engine block B, so that the axes X of the bores 12 will lie in exact coincidence with the axes Y of the respective slide mandrels 22 when the engine block B is stationed at the liner sleeve inserting work station L of the apparatus. This co-alignment of the bore axes X with the mandrel axes Y thus assures that the liner sleeves 10 that are slidably preloaded onto the mandrels 22 in concentric relation therewith will be in turn in axially aligned relation with the bores 12 of the engine block B, when positioned at station D, for subsequent axial shuttling of the liner sleeves off the slide mandrels 22 and into the respective bores 12.

Figure 1:
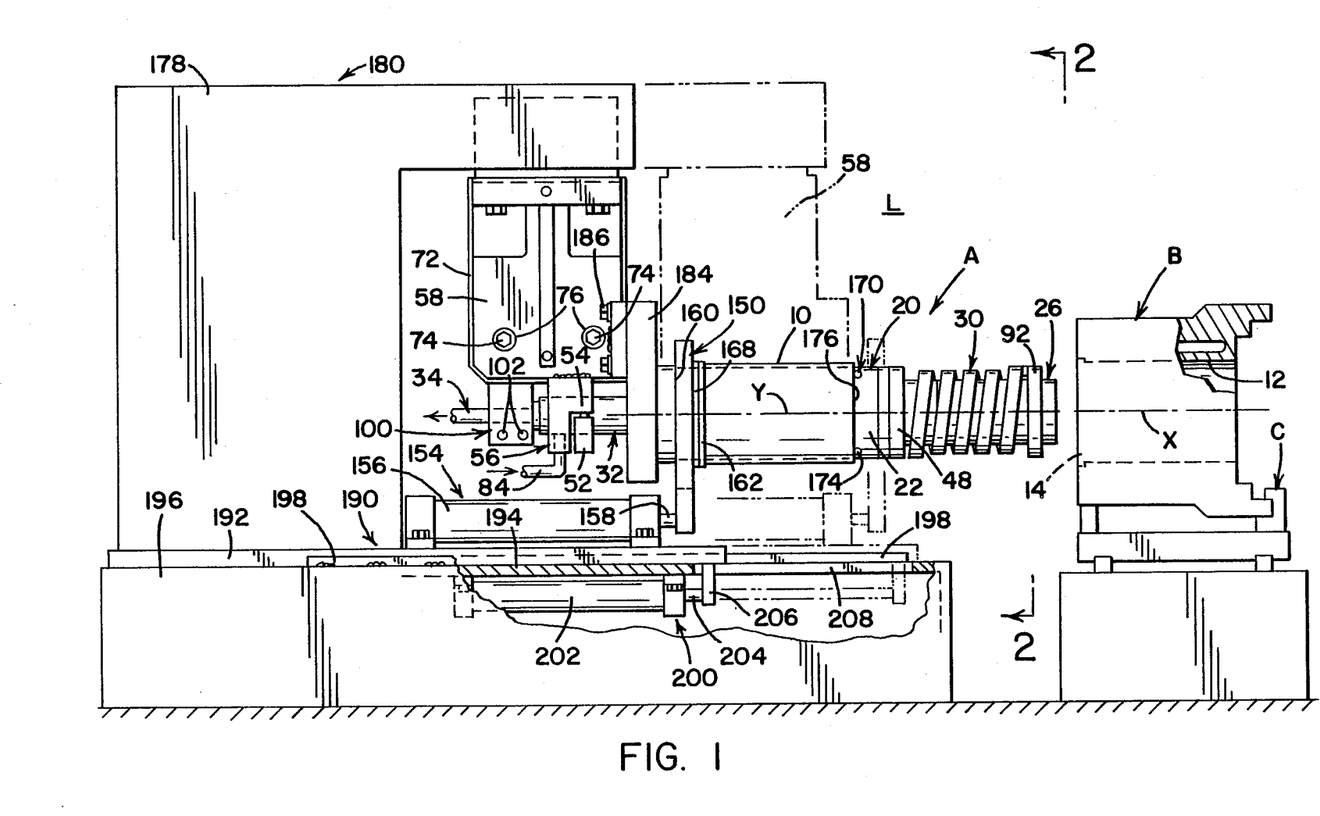
FIG. 1 is a front elevation, shown partly broken away in section, of apparatus according to the invention for assembling metal liner sleeves into the bores of metal bodies by the method comprising the invention.

As shown in FIG. 1, the slide mandrels 22 of the inductor units or heads 20 are provided with cylindrical shaped forward end portions or extensions 26 of reduced diameter which are axially aligned with the respective mandrels 22 and face toward and are disposed opposite and terminate closely adjacent the open outer ends 14 of the respective bores 12 of an engine block B positioned at the work station L. Fitted over and fixedly supported in place on the reduced diameter end extension 26 of each mandrel 22 so as to be axially aligned with the respective mandrels 22 is a linear induction heating coil 30 for inductively heating the wall of the respective bore 12. The coils 30 are formed of copper tubing preferably of rectangular cross-section and have an axial length approximately corresponding to that of the engine block bores 12 to be heated so as to space and inductively heat substantially the full length of the bores 12 when the coils 30 are in their fully inserted heating position therein, as shown in FIG. 3.

Figure 2:
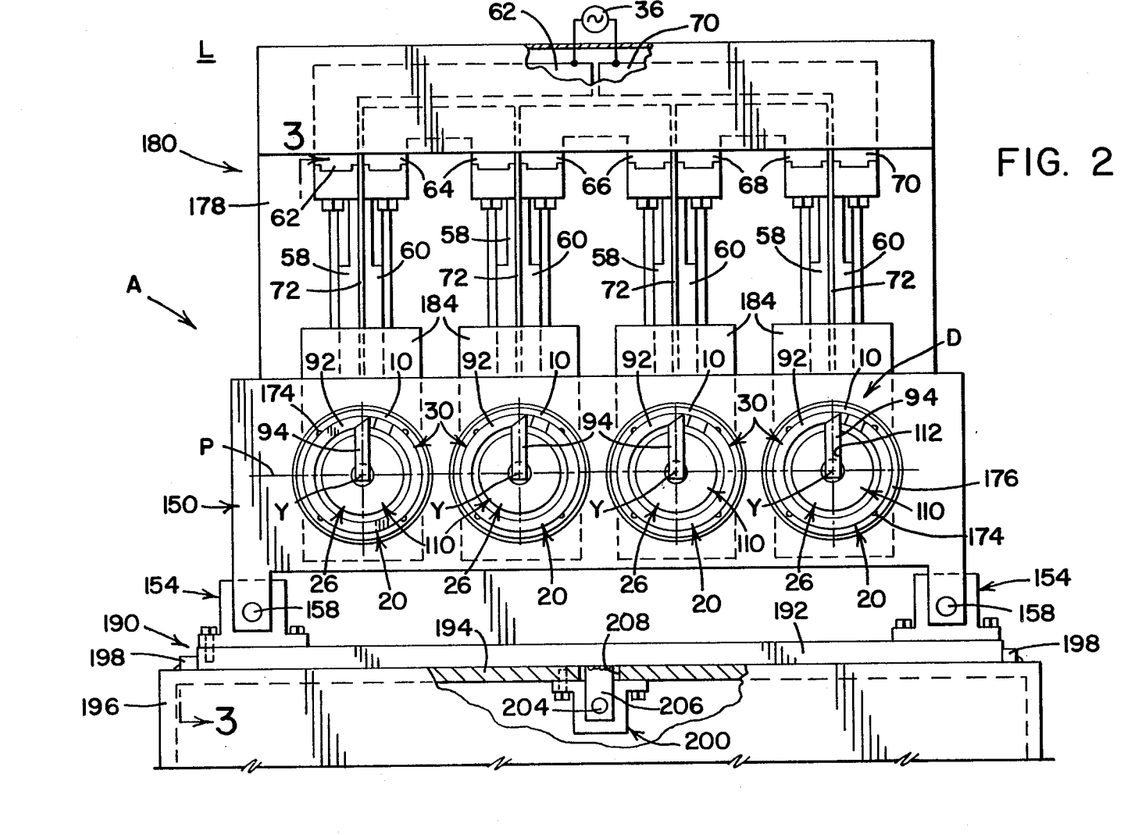
FIG. 2 is an enlarged end elevational view, taken on the line 2—2 of FIG. 1 and shown partly broken away in section, of the apparatus comprising the invention.
Figure 6:
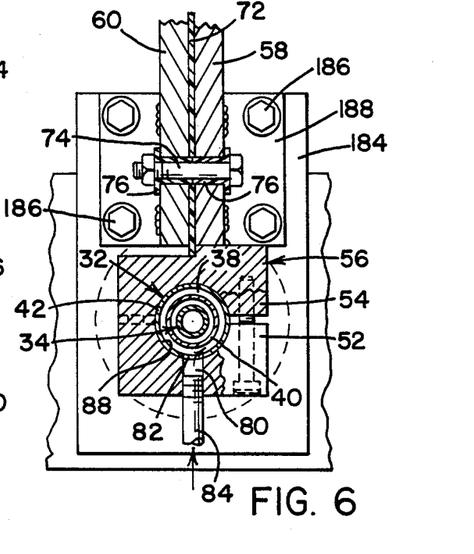
FIG. 6 is a fragmentary section view of the apparatus taken on the line 6—6 of FIG. 3.

Coaxial hollow outer and inner electrical conductor leads 32 and 34 of copper, for example, extend axially through the center bore 24 of the slide mandrels 22 and supply high frequency electrical energy to the heating coils 30 for energizing them from a suitable high frequency power supply schematically represented as 36 in FIG. 2. The hollow leads 32, 34 also supply cooling liquid to the induction heating coil 30. Outer conductor lead 32 comprises a double walled tubular member provided with an annular passageway 38 extending longitudinally therethrough between the inner and outer tubular walls 40, 42. The annular passageway 38 is closed off at the opposite ends of the conductor lead 32 by annular end closure members 44, 46 secured to the ends of the walls 40, 42 which form the outer lead 32. The outer conductor lead 32 is fitted within and extends coaxially through the center bore 24 of, and beyond the opposite ends of the slide mandrel 22, and it is electrically connected at one end to the end of the last turn 48 of the inductive heating coil 30 by a short, radially extending, hollow connector conductor lead 50 the interior passageway of which also connects the annular passageway 38 of the outer conductor lead 32 with the hollow interior of the last coil turn 48 of the coil so as to convey the liquid coolant from the hollow connector lead 32 into the coil. At its other or rearward end, the outer conductor lead 32 is electrically connected by a saddle-type copper clamp member 52 to a complementary saddle portion 54 of a copper terminal contact member 56 which is adhered as by welding to one of the two plate-shaped copper fishtail end portions 58, 60, e.g. to fishtail end portion 58, of the various pairs of the bus bar mains 62–64, 64–66, 66–68, 68–70 of the high frequency power supply 36 which bus bar pairs supply the high frequency power to the respective induction heating coils 30. The two fishtail end portions 58, 60 of each of the respective pairs of bus bars 62–64, 64–66, 66–68, 68–70 are clamped together in electrically insulated relation, with a plastic insulator sheet 72 interposed therebetween to electrically insulate the fishtail end portions 58–60 from one another, by means of fastening bolts 74 provided with collared plastic insulator sleeves 76 thereon, as shown in FIG. 6.

The terminal contact block 56 is provided with a radial inlet passageway 80 which communicates with the annular cooling liquid passageway 38 of the outer conductor lead 32 through a registered opening 82 in the outer wall 42 thereof. The inlet passageway 80 is connected at its outer end by inlet tubing 84 to a suitable supply of liquid coolant for circulation through the outer conductor lead 32 and the hollow turns of the induction heating coil 30. A pair of conventional O-ring seals 86 are seated in a spaced pair of annular grooves in the bore passageway 88 in the terminal contact member 56 through which bore passageway 88 the outer connector lead 32 extends with a sliding fit. The O-ring seals 86 are located, as shown, in the bore passageway 88 of the terminal contact member 56 on opposite sides of the inlet passageway 80 thereof, axially of the bore passageway 88, and they are compressed against the outer wall 42 of the conductor lead 32 to thereby form a liquid tight seal therewith for preventing the outward leakage, between the outer conductor lead 32 and the bore wall 88 of the terminal contact member 56, of the liquid coolant as it is introduced from the inlet passageway 80 into the opening 82 in the outer wall 42 of the outer conductor lead 32.

Figure 3:
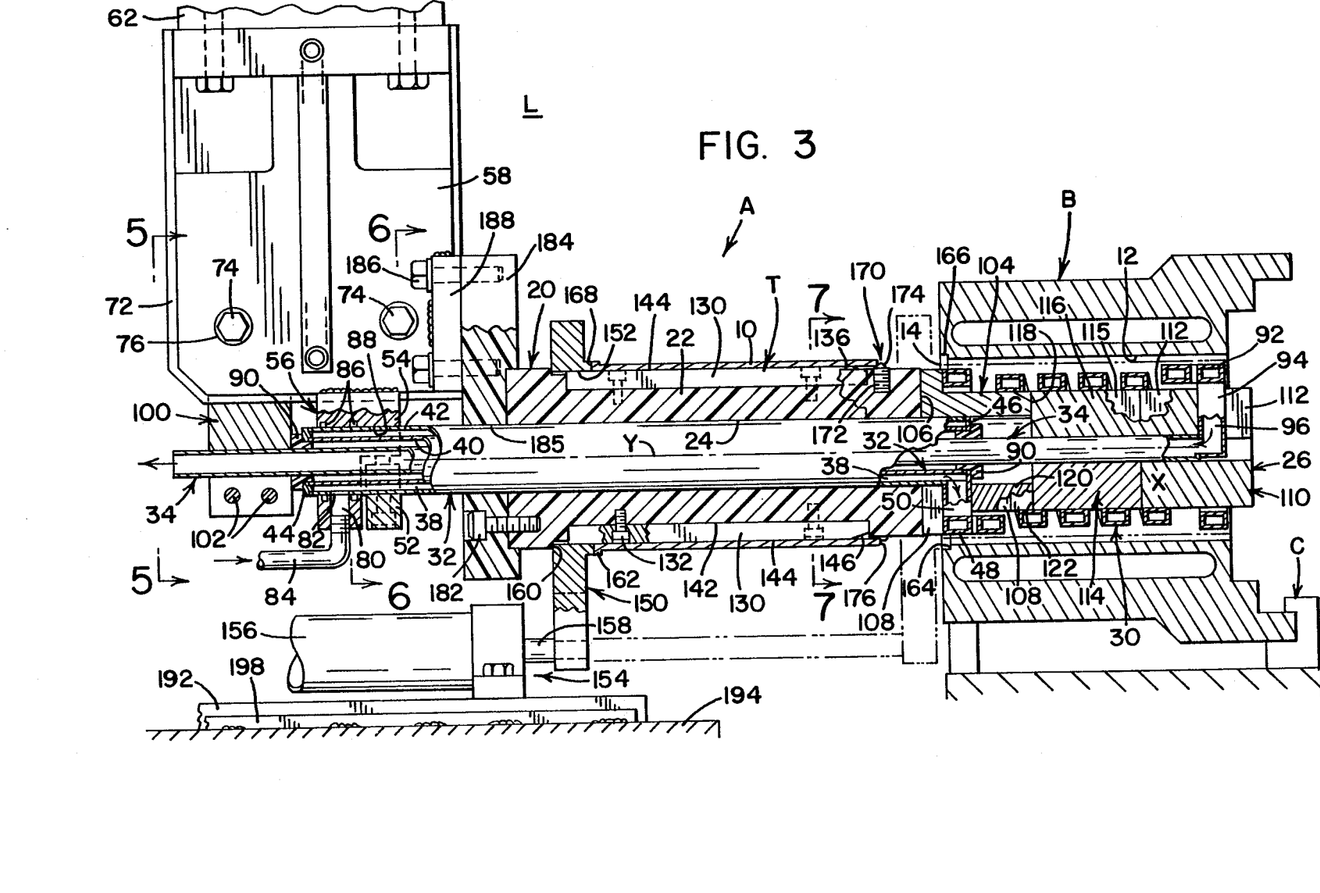
FIG. 3 is a further enlarged partial front elevational view taken on line 3—3 of FIG. 2 and similar to FIG. 1 but shown partly in section axially through one of the axially reciprocable liner sleeve carrying inductor mandrel units of the apparatus shown in its advanced position with the induction heating coil thereof inserted in heating position within one of the bores of an engine cylinder block.

The inner conductor lead 34 comprises a cylindrical copper tube extending centrally through and coaxially with the outer conductor lead 32 and projecting outwardly beyond the opposite ends of the lead 32, as shown in FIG. 3. The inner conductor lead 34 is supported at the opposite ends of the outer conductor lead 32 and held in coaxial relation therewith by grommets 90 of suitable insulating material such as rubber and press fitted into the open opposite ends of the outer conductor lead 32, between the inner wall 40 thereof and the wall of the inner conductor lead 34. At its forward end, the inner conductor lead 34 is electrically connected to the end of the first turn 92 of the induction heating coil 30 by a short radially extending hollow connector conductor lead 94 the interior passageway 96 of which also connects the interior passageway of the inner conductor or tube 34 with the hollow interior of the first turn 92 of the coil 30 so as to convey the liquid coolant from the coil 30 into the tubular inner conductor lead 34. At its rearward end, the tubular inner conductor lead 34 is connected either to a suitable drain for discharging thereinto the circulated coolant from the coil 30, or to a cooling system (not shown) for re-cooling and recirculation of the liquid coolant through the coil 30 during repeated operating cycles of the apparatus A.

The rearward end portion of the center or inner conductor lead 34 that projects outwardly beyond the rearward end of the outer conductor lead 32 is electrically connected, by a split collar type copper terminal contact member 100, to the other fishtail end 60 of the particular pair of the bus bars 62-64, 64-66, 66-68 or 68-70 that is connected to the respective induction heating coil 30. The terminal contact member 100 is brazed to the copper fishtail end 60 of the bus bar and is clamped around the tubular inner conductor lead 32 in tight electrical contact therewith by fastening bolts 102.

The forward end portions 26 of the slide mandrels 22, on and over which the respective heating coils 30 are mounted, are composed of a material such as renders the end portions effective as flux intensifiers for concentrating the flux field generated by the coils 30, when energized, within the walls of the respective bores 12 so as to promote the heating and expansion thereof to the required degree to permit axial insertion of the liner sleeves 10 thereinto. For such purpose, the forward end portions 26 of the slide mandrels 22 are formed of a material of high electrical resistivity and high magnetic permeability such as, for example, bonded ferrite or the material commercially known as Ferrocon and composed of magnetically permeable articles bonded together with a plastic binder.

Because of the presence at the ends of the heating coils 30 of the connector lead portions 50 and 94 extending partially across and blocking the opening into the interior of the coils 30, the forward end portions 26 of the slide mandrels 22 therefore cannot be assembled into the respective coils 30, and with the coaxial conductor leads 32, 34, as a single unitary member but instead must necessarily be formed as a composite structure comprised of a number of separate elements or component parts which then can be inserted in and assembled together within the respective coils 30 along with the conductor leads 32, 34 thereof. To this end, the forward end portions 26 of the mandrels 22 may be composed, as shown, of (I) an outwardly flanged rearward collar member 104 for fitting over the forward end portion of the outer conductor lead 32 that projects from the forward end 106 of the sleeve mandrel 22, the member 104 having a radial slot 108 for receiving the connector lead 50 therein; (II) a forward collar member 110 for fitting over the forward end of the tubular inner conductor 34 and provided with a radial slot 112 for receiving the connector lead 94 therein; (III) an intermediate collar member 114 for fitting over the projecting forward end portion of the tubular inner conductor lead 34 and having a radial slot 115 similar to the slot 112 for permitting insertion of the member 114 into the interior of the coil 30 with the connector lead 94 passing through this slot 115; (IV) an intermediate filler bar 116 for insertion into and filling the radial slots 112, 115 in the members 110 and 114 and abutting at its opposite ends against the connector lead 94 and the collar end 118 of the flanged collar 104; and, (V) a short filler bar 120 for insertion into and filling the radial slot 108 in the rearward collar member 104 and abutting at its opposite ends against the connector lead 50 and the end 122 of the intermediate collar member 114. After the fitting and assembly of all the component members 104, 110, 114, 116, 120 into and within the coil 30, the tubular inner conductor 34 is then pulled backwardly relative to the mandrel 22 to its limiting position, to cause the radial connector lead 94 to clamp the members 116 and 104 backwardly against the forward end 106 of the mandrel 22 and thereby lock these members together in assembled position with the coil 30 on the mandrels 22 to form the forward end extension 26 thereof. The tubular inner conductor 34 is then clamped in such coil mounting and assembled position with the members 104, 110, 114, 116, 120 by clamping the rearwardly projecting end of the conductor 34 securely within the terminal contact member 100 which is fixedly secured to the fishtail end 60 of the respective pair of bus bars. The outer or forward collar member 110 is suitably secured in place to the intermediate collar member 114 as by bonding it thereto with a suitable adhesive or room temperature vulcanization.

Figure 4:
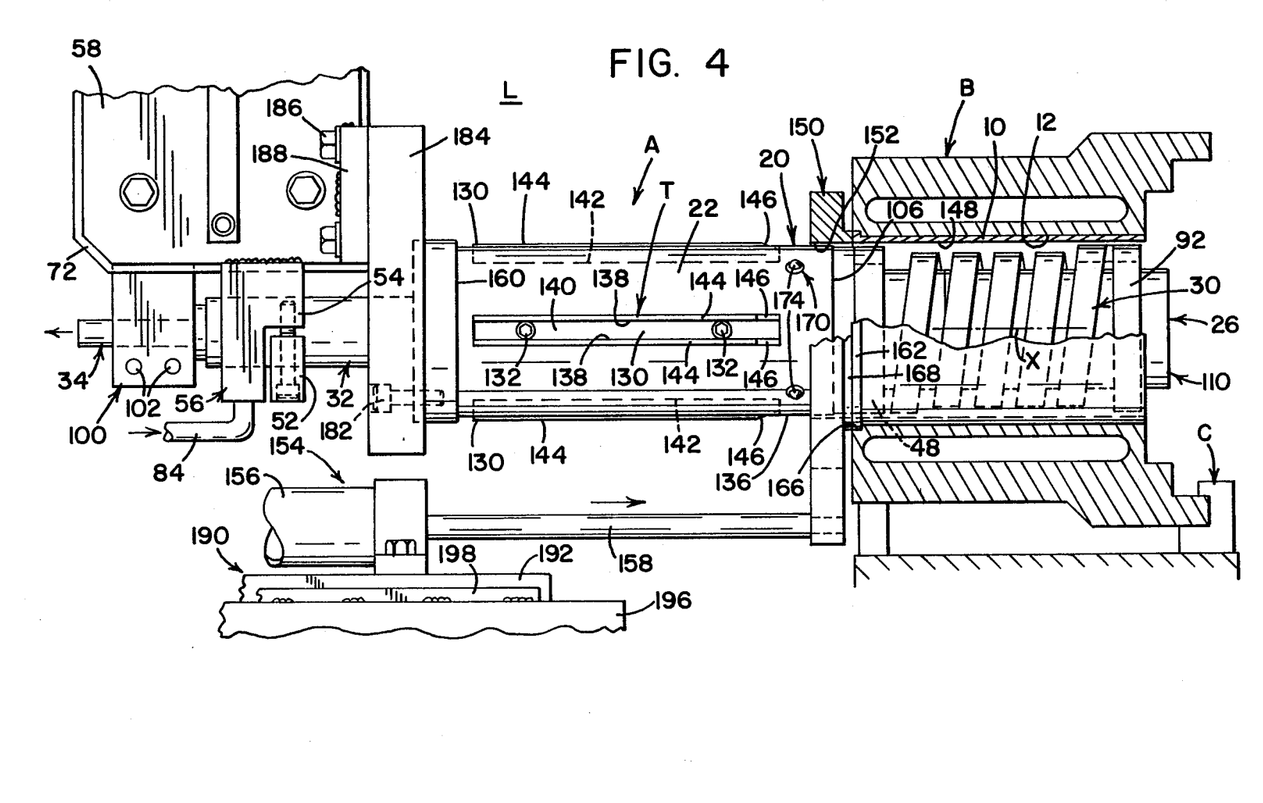
FIG. 4 is a partial front elevational view similar to FIG. 3 and shown partly in section but with a liner sleeve shown shuttled from its loaded position on the inductor unit into its inserted position within the bore of the engine cylinder block.
Figure 5:
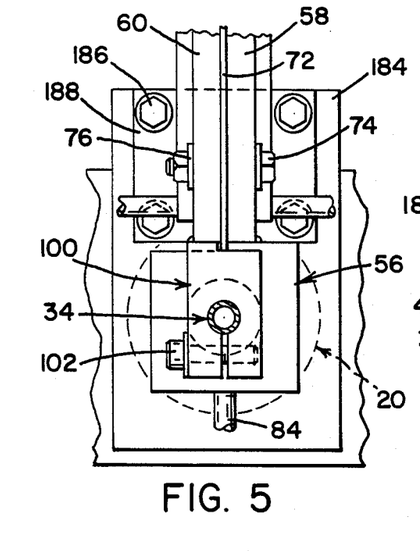
FIG. 5 is a fragmentary end elevational view of the apparatus comprising the invention as viewed on the line 5—5 of FIG. 3.
Figure 7:
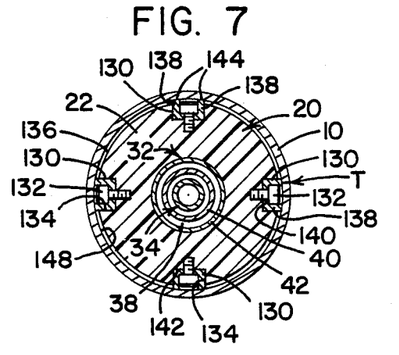
FIG. 7 is a sectional view on the line 7—7 of FIG. 3 through one of the inductor units of the apparatus and showing a liner sleeve in loaded position thereon.

As shown particularly in FIGS. 3, 4 and 7, the slide mandrels 22 of the inductive units or heads 20 are each provided with a locator guide or slide track T for slidably receiving and positioning the liner sleeves 10 thereon in precise coaxial relationship with the respective mandrels 22. On subsequent sliding or shuttling of the liner sleeves 10 off the mandrels 22 and into the bores 12 of an engine block B positioned at the work station L, the slide track T acts to guide the liner sleeves 10 axially into the respective engine block bores 12 in precise coaxial alignment therewith and with the axes X thereof which are then coincident with the axes Y of the respective mandrels 22.

Figure 10:
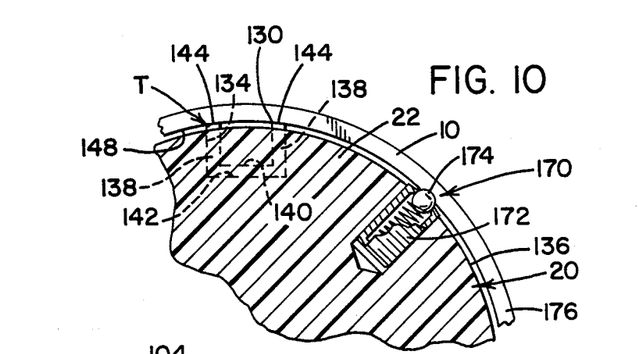
FIG. 10 is a fragmentary sectional view on the line 10—10 of FIG. 9 of the modified inductor unit shown therein; and, FIG. 11 is an exploded perspective view of the flux intensifier elements enclosed within the induction heating coils of the apparatus.
Figure 11:
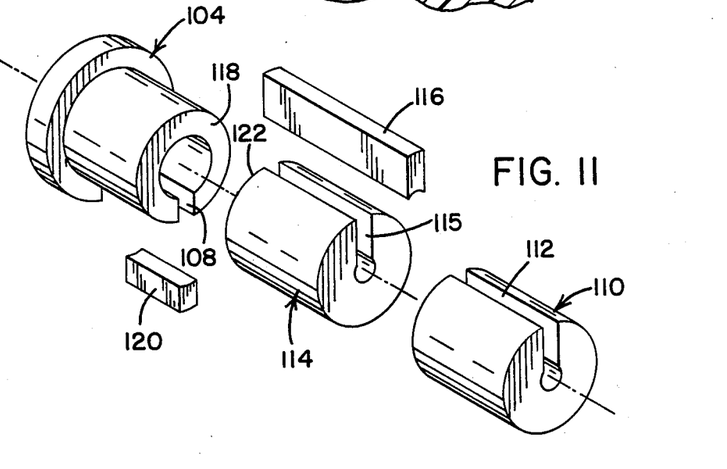

The locator guide or slide track means T on each mandrel 22 is comprised of a plurality (four in the particular form of the invention illustrated in FIGS. 1-7) of elongated, parallel, alike slide or guide rails 130 of hardened steel which extend parallel to the mandrel axis Y and are fitted and seated within, and fixedly secured as by fastening screws 132, for instance, in longitudinally extending parallel grooves 134 (FIG. 7) in the cylindrical exterior 136 of the mandrel. The slide rails 130 are preferably of U-shaped section with parallel side wall portions 138 extending in a direction generally radially outward of the mandrel 22, a flat base wall portion 140 seated against the bottom wall 142 of the respective groove 134 in the mandrel. As shown in FIGS. 3, 7 and 10, the side wall portions 138 of the slide rails 130 project radially outward beyond the cylindrical outer surface 136 of the respective mandrel 22 a slight distance, e.g. preferably around 0.05 inch or so, to afford clearance for easy loading and sliding movement of the liner sleeves 10 over the mandrels 22 and onto the locator guide tracks T of the mandrels over the slide rails 130 thereof. For such purpose also, the outer edges 144 of the slide rails 130 are formed with beveled forward ends 146 (FIGS. 3 and 4) for guiding the liner sleeves 10 into axially aligned concentric relation with the slide mandrels 22 and snug sliding engagement with the outer edges 144 of the slide rails 130, during the loading of the liner sleeves onto the slide mandrels of the various inductor units or heads 20.

As shown in FIG. 7 and particularly in FIG. 10, the outwardly facing edges 144 of the two side walls 138 of each slide rail 130 are arcuately curved transversely of the slide rail to correspond to the circular curvature of the cylindrical inner wall 148 of the liner sleeves 10 to be slidably fitted thereover on loading onto the mandrels 22 of the respective inductor units or heads 20. Also, side rails 130 on each mandrel 22 are located in positions spaced apart circumferentially around the mandrel 22 such as assures and maintains the concentric positioning and supporting of the liner sleeves on the mandrels when the sleeves are slidably engaged with the slide rails. To this end, where only two slide rails 130 are provided on each mandrel 22, they necessarily must be spaced exactly 180° apart around the circumferential extent of the mandrel. Where three or more slide rails 130 are provided on any one of the mandrels 22, at least two of the slide rails must be spaced in such case at least 90° apart from a third one of the slide rails, around the circumferential extent of the mandrel, and on opposite sides of the diametrical plane of the mandrel which includes such third one slide rail. In any event, however, the arcuately curved outer edges 144 of all the side walls 138 of all the slide rails 130 provided on the mandrel 22 must necessarily define, in effect, a phantom cylinder concentric with the axis Y of the mandrel 22 and corresponding exactly to the cylindrical contour and diameter of the inner wall 148 of the liner sleeve 10 so as to provide a snug, substantially tolerance free, sliding fit of the liner sleeves 10 on the slide rails 130. In the particular form of the invention illustrated in FIGS. 1-7 where four slide rails 130 are provided on each mandrel 22, the four slide rails are preferably equally spaced apart from one another, i.e., spaced 90° from each other as shown in FIG. 7, around the circumferential extent of the mandrel. In the modified form of the invention shown in FIG. 8 wherein only three slide rails 130 are provided on each mandrel 22, the three slide rails in such case are also preferably equally spaced apart from one another, i.e., spaced 120° from each other, around the circumferential extent of the mandrel.

The sliding shuttling movement of the liner sleeves 10 off the locator guide tracks T of the inductor units or heads 20 and into the heated bores 12 of the engine block B at the work station L of the apparatus, is effected by a vertically disposed metal shuttle or drive plate member 150 which is common to and slidably fitted over the slide mandrels 22 and guide tracks T of the respective inductor units 20 for horizontal sliding movement axially thereof. The shuttle or drive plate 150 is provided with a plurality of apertures 152 which correspond in contour to the circumferential contour of that portion of the slide mandrels 22 provided with the guide track T, and which are located in the same row aligned spaced relation to each other as the inductor units 20 comprising the bank D thereof, so as to accommodate respective ones of these units 20 therein. The shuttle plate 150 is horizontally reciprocated, by operating means 154 comprised of hydraulic power cylinder means 156 having its piston rod means 158 connected to the shuttle plate 150, between a retracted inoperative position (FIGS. 1 and 3) abutted against annular shoulders 160 on the exterior of each slide mandrel 22 and an advanced operative position as shown in FIG. 4, to effect the simultaneous shuttling of all the liner sleeves 10 loaded on the respective inductor units or heads 20 axially into, and maintain them in their fully inserted seated position in the respective bores 12, until the heated walls of the bores cool sufficiently to form a tight shrink fit around the inserted liner sleeves 10.

The seated inserted positions of the liner sleeves 10 in the respective bores 12 of the engine block B are determined by the abutting engagement and seating of an outwardly flanged trailing rim end 162 of the liner sleeves 10 against the annular shoulders 164 provided within the respective bores 12 at their open outer or top ends 14 by counterbores 166 formed therein. In the axial shuttling by the shuttle plate 150 of the liner sleeves 10 simultaneously off the inductor units or heads 20 and axially inserting them into the respective heated bores 12 in the engine block into their seated positions therein, annular ribs 168 provided on the shuttle plate 150 bordering each of the apertures 152 therein abut against and engage with the flanged trailing rim ends 162 of the liner sleeves with an interfacing surface engagement therebetween around the full circular extent of the rim ends 162. This interfacing surface engagement of the annular ribs 168 on the shuttle plate 150 with the trailing flanged rim ends 162 of the liner sleeves 10 is then maintained, after the liner sleeves are positioned in their fully seated position in the heated bores 20, until the walls of the bores 12 cool and contract sufficiently to form a tight shrink fit around the inserted liner sleeves 10 so as to then hold them in proper axial position therein. By maintaining this interfacing surface engagement of the annular ribs 168 on the shuttle plate 150 with the trailing flange rim ends 162 of the liner sleeves, the shuttle plate along with its annular ribs 168 then act as a heat sink means serving to extract heat from and thus cool the outer end portions of the walls of the bores 12, at their open outer ends 14, at a faster rate than the remaining axial extent of the bore walls, so that a tight shrink fit of the bore walls around the liner sleeves 10 is formed initially at the outer ends 14 of the bores 12 such as then additionally serves to prevent any axial displacement of the liner sleeves outwardly of the bores from their proper seated axial position therein.

Because the loading of the liner sleeves 10 onto the inductor units or heads 20 of the apparatus A would be blocked and prevented by an engine block B if present at such time at the liner sleeve work station L of the apparatus, the liner sleeve loading operation, therefore, is necessarily carried out during the interval while no engine block B is located at the work station L of the production line slide track C. During such interval, the four liner sleeves 10 to be individually loaded onto respective ones of the inductor units or heads 20 comprising the bank D thereof, are axially aligned with the unobstructed forward ends 26 of the inductor units 26 and then axially moved over the induction heating coils 30 thereof and slidably moved onto the locator guide or slide track portions T of the slide mandrels 22 to axially align the liner sleeves 10 with the respective mandrels 22 and position them in their proper axial loaded position thereon with their rearwardly located flanged ends 162 abutting against the locating annular ribs or shoulders 168 on the shuttle plate 150 which at such time is in its retracted position (FIG. 3). It will be appreciated that the above described liner sleeve loading operation can be performed either manually, or carried out instead by suitable automatically operating liner sleeve feeding and loading mechanism operating in timed sequence with the index cycles of the engine blocks B along the production line slide track C.

Figure 9:
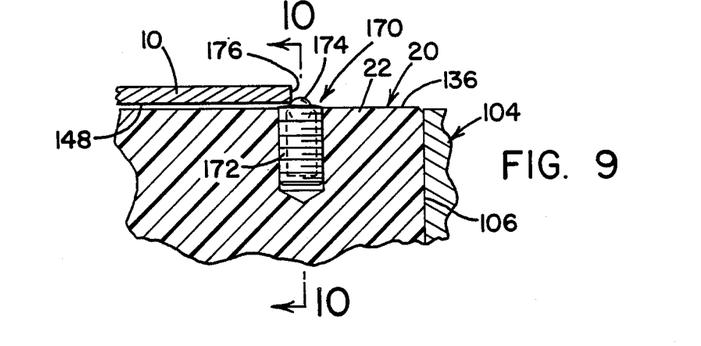
FIG. 9 is a further enlarged fragmentary axial sectional view of another modified form of inductor unit according to the invention.

Suitable retaining means 170 are provided on the slide mandrels 22 for retaining the liner sleeves 10 in place in their loaded axial position on the mandrels. As shown particularly in FIGS. 9 and 10, the retaining means 170 may comprise a plurality of spring loaded ball checks 172 which are secured within apertures in the exterior of the mandrels 22 at spaced locations therearound, with their ball ends 174 normally protruding a slight distance above the cylindrical outer surface 136 of the mandrels 22 so as to snap-lock behind and engage with the forward rim ends 176 of the liner sleeves 10, on sliding movement of the sleeves to their proper loaded axial position on the mandrels, to thereby yieldingly retain the sleeves 10 in place thereon in such loaded position. Because of their radially inward yieldability, the liner sleeves 10 simply depress and ride over the ball ends 174 of the ball checks 172 when the shuttle plate 150 is subsequently actuated to axially shuttle the liner sleeves 10 off the slide mandrels 22 and insert them into the respective bores 12 of the engine block B.

The slide mandrels 22 of the inductor units or heads 20 are cantilever supported at their rearward ends on respective pairs of the bus bars 58, 60 to thereby locate and support the inductor units or heads 20 in the aforementioned side-by-side, horizontal row aligned, parallel relation, with their mandrel axes Y extending horizontally and parallel to one another. The bus bars 58, 60 in turn are fixedly supported in electrically insulated relation on the slide member 178 of a high frequency power supply work station (FIG. 1) that houses the high frequency power supply 36 and comprises a slide head assembly 180. The slide mandrels 22 are supported on the respective pairs of bus bars 58, 60 by being supported on the respective pairs of bus bars 58, 60 by being fixedly secured, as by means of fastening bolts 182, to respective vertical mounting plates 184 of suitable electrically insulative material such as laminated plastic, each having an aperture 185 for the accommodation therein of the outer conductor lead 32 of the respective mandrel. The plates 184 are each fixedly secured, in turn, as by bolts 186, to respective pairs of metal ear members 188 which extend laterally outward from, and are suitably secured as by brazing to the fishtail ends 58, 60 of respective ones of the pairs of bus bar means 62–64, 64–66, 66–68, 68–70 which supply the high frequency electrical power from the supply 36 thereof to the induction heating coils 30 on the various heads 20 and which are fixedly supported in electrically insulated relation on the slide member 178 of the slide head assembly 180.

As shown in FIGS. 1 and 2, the slide head assembly 180 is mounted for horizontally reciprocable slide movement parallel to the parallel extending axes Y of the slide mandrels 22, on a machine tool base slide 190 comprised of a horizontally disposed base plate 192 on the slide member 178 which plate is slidably rested on a horizontal bed plate portion 194 of a stationary bed member 196 and is slidable within a guideway formed by a pair of spaced parallel guide bars 198 welded or otherwise secured to the top side of the bed plate portion 194 of bed member 196. The slide head assembly 180 and the bank D of inductor units or heads 20 cantilever supported thereon, are horizontally reciprocated in unison between a retracted position as shown in FIG. 1 and an advanced position as shown in FIGS. 3 and 4, by actuating means 200 comprised of primary hydraulic power cylinder means 202 mounted on the underside of the bed plate portion 194 of the bed member 196 and having its piston rod 204 connected to a bracket arm 206 welded or otherwise secured to the underside of the base plate 192 of the slide member 178 and extending downwardly through and movable within a slot 208 in the bed plate portion 194. In its retracted or inoperative position, the inductor units or heads 20 are located n a position in which they are clear of and permit unobstructed index movement of the engine blocks B along the production line slide track C to the liner sleeve inserting work station L of the apparatus. In the advanced or operative position of the inductor units or heads 20, the induction heating coils 30 thereof are located in their axially inserted heating position within the respective bores 12 of an engine block B positioned at the work station L of the apparatus.

Figure 8:
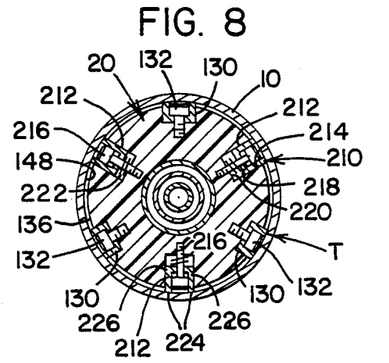
FIG. 8 is a sectional view similar to FIG. 7 but showing a modified form of inductor unit according to the invention.

FIG. 8 illustrates a modification of the invention wherein the inductor units or heads 20 are provided with a modified form of retaining means 210, instead of the retaining means 170, for yielding holding the liner sleeves 10 in place on the slide mandrels 22 in their proper loaded position thereon (FIGS. 1 and 3) against accidental total axial removal therefrom, or against partial displacement thereon such as might obstruct or interfere with the index movement of an engine block B along the production line slide track C into the liner sleeve inserting work station L of the apparatus or would partially enclose the heating coils 30 and thus not only be themselves heated by the coils but also block the proper heating of the bore walls by the coils.

The modified liner sleeve retaining means 210 is comprised in general of a plurality (three in the particular case illustrated) of elongated, hardened steel, gripper bar members 212 slidably fitted and recessed in respective longitudinally extending radial grooves 214 in the cylindrical exterior 136 of the respective slide mandrels 22 and spring loaded in a direction radially outwardly of the mandrel so as to yieldingly engage, with a friction grip, the inner wall 148 of the liner sleeve 10 loaded onto the mandrels to thereby hold them in place thereon against axial displacement. As shown, the three gripper bar members 212 may be equally spaced apart, i.e., spaced 120° apart, around the circumferential extent of the respective mandels 22 and each located more or less centrally between the three similarly equally spaced apart slide rails 130 around the circumferential extent of the respective mandrels 22.

The particular gripper bar members 212 illustrated in FIG. 8 are of U-shaped cross-section similar to the slide rails 130, and they are radially slidably retained within the respective grooves 214 by retainer screws 216 which are inserted through apertures in the flat base walls 218 of the gripper bar members 214 and screw threaded into registering threaded openings in the bottom walls 220 of the grooves 214.

The gripper bar members 212 are each spring loaded on biased in a direction radially outwardly of the grooves 214 by a plurality of coil springs 222 which are located in the grooves in a position interposed and compressed between the base walls 218 of the gripper bar members and the bottom walls 220 of the grooves 214. The spring loaded travel of the gripper bar members 212 radially outwardly of the mandrels 22 by the springs 222 is restricted, however, to a uniform predetermined limited distance as determined by the engagement of their base walls 218 with the heads of the retainer screws 216. In their limiting, radially outwardmost positions as thus fixed by the heads of the retainer screws 216, the top or outwardly facing edges 224 of the side walls 226 of the gripper bar members 212 project outwardly beyond the cylindrical outer surface 136 of the mandrels 22 to a radius dimension, From the axes Y of the mandrels 22, which is slightly greater than the radius dimension of the liner sleeves 10 in order to thereby assure the aforementioned yielding friction grip of the gripper bar members with the inner walls 148 of the liner sleeves 10 such as is necessary to the retention of the liner sleeves in their loaded axial position on the mandrels 22. As in the case of the slide rails 130, the top or outwardly facing edges 224 of the gripper bar members 212 are similarly arcuately curved transversely thereof to correspond to the circular curvature of the cylindrical inner wall 148 of the liner sleeves 10 whereby to afford the maximum friction gripping surface area and holding force of the gripper bar members on the liner sleeves 10. Also as with the slide rails 130, the outer edges 224 of the gripper bar members 212 are formed with beveled forward ends similar to the beveled ends 146 of the slide rails in order to aid in guiding the liner sleeves 10 and facilitate the loading thereof onto the mandrels 22 of the inductor units or heads 20.

In the operation of the apparatus A according to the invention for assembling the liner sleeves 10 into the cylinder bores 12 of an engine cylinder block B by the method slipped one over the exposed forward end of, and positioned in their proper loaded position on the slide mandrel 22 of respective ones of the inductor units or heads 20 in the bank D thereof, either by manual manipulation of the liner sleeves or by automatically operating loading mechanism, during the interval while there is no engine block B located at the liner sleeve inserting work station L of the apparatus and while the heads 20 and their mandrels 22 both are located in their respective retracted positions (FIG. 1), the engine block B on the production line slide track C which is to have liner sleeves assembled into the cylinder bores 12 thereof is then indexed to and positioned at the liner sleeve inserting work station L of the apparatus with their cylinder bores 12 in exact axial coincidence with the slide mandrels 22 of respective ones of the inductor units or heads 20. Thereupon, the primary hydraulic power cylinder 202 of the actuating means 200 is operated to slide the slide head assembly 180 in its machine tool slide 190 and the heads 20 carried thereby to their advanced operating position (FIGS. 3 and 4) to axially insert the induction heating coils 30 of the heads 20 into their proper axial heating position within the aligned bores 12 of the engine block B then stationed at the work station L.

With the induction heating coils 130 thus located in their proper axial heating position within the cylinder bores 12 of the engine block B, the heating coils 130 are then energized by the operation of the high frequency power supply 36 to effect the induction heating of the walls of the bores 12 to a predetermined elevated temperature to circumferentially expand the bore walls to a diameter sufficient to slidably receive the liner sleeve 10 thereinto with a snug sliding fit. During the energization of the heating coils 30, liquid coolant from the supply thereof is circulated through the hollow conductor leads 32, 34 and the coils 30 in order to cool the latter. Through the use of the coaxial conductor lead arrangement 32, 34, the comparatively thin walled metallic liner sleeves 10 are not heated by stray flux produced by the energized heating coils 30.

As soon as the walls of the bores 12 reach the selected predetermined temperature, the heating coils 30 are de-energized and, while the heating coils are maintained in place in their axial heating position within the respective bores 12, the secondary hydraulic power cylinder 156 of the shuttle plate operating means 154 is then immediately actuated to advance the shuttle plate 150 to its advanced operative position to slide the liner sleeves 10 on the inductor units or heads 20 in unison off the slide tracks T of the respective slide mandrels 22 and over the de-energized induction heating coils 30 thereof, and axially insert the liner sleeves into the respective bores 12 in the engine block B to their predetermined axial inserted position therein (FIG. 4) with their trailing flange rim ends 162 seated against the annular shoulders 164 formed at the outer ends 14 of the bores 12 by the counterbores 166 therein.

The inserted liner sleeves 10 are maintained fixed in their seated inserted axial position in the bores 12 until the heated walls of the bores cool and circumferentially contract sufficiently around the inserted liner sleeves 10 to form a tight shrink fit therearound. The maintenance of the liner sleeves 10 in their seated axial inserted position within the bore 12 of the engine block B, during the cooling and contracting therearound of the walls of the respective bores 12, is effected by maintaining the shuttle plate 150 in its advanced position so as to maintain the abutting interface engagement of the annular ribs 168 thereon with the flanged rim ends 162 of the liner sleeves 10.

As a consequence of the continued maintenance of the interface engagement of the shuttle plate 150 with the flanged rim ends 162 of the liner sleeves 10 during the cooling and contracting of the walls of the bores 12, the shuttle plate 150 thus also functions at such time as a heat sink means for extracting from the trailing end rim portions 162 of the liner sleeves 10 the heat conducted thereto from the outer end portions 164, 166 of the heated bore walls engaged with the trailing end rim portions 162 of the liner sleeves 10. This heat extraction from the walls of the bores 12 by the shuttle plate 150 then acts to cool and contract the outer end portions of the heated walls of the bores 12 engaged with the trailing end portions of the liner sleeves 10 at and adjacent the flanged rim ends 162 thereof at a faster rate than the normal ambient cooling and contracting of the remaining axial extent of the bore walls, thereby producing a tight shrink fit of the walls of the bores 12 circumferentially onto and around the liner sleeves 10 initially at such outer end portions of the bore walls. The maintenance of the shuttle plate 150 in continuous engagement with the liner sleeves 10 during the cooling and contracting of the walls of the heated bores 12 thus prevents the axial displacement of the liner sleeves 10 axially outwardly of the bores 12 during the cooling and contracting of the bore walls onto the liner sleeves and assures the shrink fitting of the liner sleeves 10 into the bores 12 in their proper axial seated position therein.

The inductive heating of the bores 12 of the aluminum engine block B is accomplished by the energization of the induction heating coils 30 with electrical energy from the high frequency power supply 36, while the coils are in their inserted heating position in the bores, with a medium frequency of 3 Khz using approximately 18 kw for around 13 seconds to achieve a bore wall temperature of approximately 350° F. The normal interference fit for the shrink fitting of the steel liner sleeves 10 into the cylinder bores 12 of the aluminum engine block B is customarily in the range of around 0.001 to 0.003 inches, i.e., the diameter of the heated bores 12, at the time of insertion of the liner sleeves 10 thereinto, should be around 0.001 to 0.003 inches greater than the outside diameter of the liner sleeves 10. The induction heating coils 30 are designed to provide a sufficient coupling or air gap, between the walls of the bores 12 and the maximum outside diameter of the various turns of the coils 30 when in their inserted heating position in the bores, to allow the cylindrical liner sleeves 10 to be freely insertable axially into the annular coupling gap space between the bore walls and the inserted coils 30.

Besides affording the advantage of enabling ready control of the temperature profile of the heated bores 12 along their axial extent in order to prevent any extrusion or axial displacement of the liner sleeves 10 outwardly of the bores during the bore wall cooling and shrinking onto the inserted liner sleeves, the liner sleeves inserting method and apparatus according to the invention also enables the bore heating operation and the liner sleeve inserting operation to be performed at a single work station such as to permit optimum bore wall heating, and without the necessity of transferring the engine block from a bore heating operation at one work station to a liner sleeve inserting operation at another station such as has been common practice in prior known methods for inserting steel liner sleeves into the cylinder bores of aluminum block engines. Thus, the method and apparatus according to the invention eliminates the time delays of such previous engine block transfer operations as well as the attendant substantial added energy expense involved in the required additional heating of the engine block in order to compensate for the loss of heat by the engine blocks and the bore walls during such transfer operations and attendant time delays.

Having thus described the invention, it is claimed:

1. The method of assembling a cylindrical metal liner sleeve into a cylindrical bore in an engine cylinder block constituted of a metal having a coefficient of expansion greater than that of said liner sleeve, said method comprising the steps of:
    (a) axially moving an induction heating coil axially of and into inductive heating position within the said engine block bore through an open end thereof;
    (b) energizing the said positioned coil to inductively heat the wall of said bore to a predetermined elevated temperature to circumferentially expand the said bore wall to a diameter sufficient to slidably receive the said liner sleeve axially thereinto with a snug sliding fit;
    (c) de-energizing the said coil and immediately slidably inserting the said liner sleeve axially into the said bore, and over the said de-energized coil positioned therein, to a predetermined inserted position in the bore; and,
    (d) then maintaining said liner sleeve fixed in said inserted position in said bore until the heated wall of said bore cools and circumferentially contracts at least sufficiently around said liner sleeve to form a tight shrink fit therearound.

2. The method as defined in claim 1, wherein a plurality of said liner sleeves are simultaneously assembled each into a respective one of a plurality of said bores in said engine block by the simultaneous performance of the respective said method steps (a), (b), (c), and (d) with respect to each of said engine block bores and each of said liner sleeves.

3. The method as defined in claim 2, wherein the said engine block is constituted essentially of aluminum and the said liner sleeves are constituted essentially of hardened steel.

4. The method as defined in claim 1, wherein the said engine block is constituted essentially of aluminum and the said liner sleeve is constituted of hardened steel.

5. The method as defined in claim 1, including the added step of cooling the outer end portion of the heated wall of said bore located at the said open end thereof and engaged with the trailing end portion of said liner sleeve, on axial insertion of said sleeve into and while located in its said axially inserted position in said bore, at a faster rate than the cooling rate of the rest of the bore wall engaged with said liner sleeve.

6. The method as defined in claim 1, including the added step of maintaining the trailing rear rim end of said liner sleeve located at the said open end of the bore, on axial insertion thereof into and while located in its said inserted position in said bore, in interfaced engagement with heat sink means for extracting from the trailing rim end portion of said liner sleeve the heat conducted thereto from the outer end portion of the heated bore wall located at the said open end thereof and engaged with the said trailing rim end portion of said liner sleeve.

7. The method as defined in claim 6, wherein the said slidable insertion of the said liner sleeve axially into the said bore is effected by the said heat sink means.

8. The method as defined in claim 1, including the added step of cooling and contracting the outer end portion of the heated wall of said bore located at the said open end thereof and engaged with the trailing rear end portion of said liner sleeve, on axial insertion of said sleeve into and while located in its said axially inserted position in said bore, at a faster rate than the cooling and contracting of the remaining portion of said bore wall, to thereby produce a tight shrink fit of the bore wall onto and around the liner sleeve initially at the said outer end portion of said bore wall.

9. The method of assembling a cylindrical metal liner sleeve into a cylindrical bore in an engine cylinder block formed of a metal having a coefficient of expansion greater than that of said liner sleeve, said method comprising the steps of:
    (a) supporting said cylindrical liner sleeve in a position adjacent an open end of the said bore in the said engine block for insertion axially into said bore through the said open end thereof and into a seated position therein;
    (b) inductively heating the wall of the said bore in said engine block to a predetermined elevated temperature, by energizing a linear induction heating coil positioned axially within the said bore, to circumferentially expand the wall of said bore to a diameter sufficient to slidably receive the said liner sleeve axially into the bore with a snug sliding fit;

(c) de-energizing the said induction heating coil and immediately slidably inserting the said liner sleeve axially into said bore, and over the said de-energized coil positioned therein, to the said seated position in the bore; and (d) then maintaining said liner sleeve fixed in said seated position in said bore until the heated wall thereof cools and circumferentially contracts at least sufficiently around said liner sleeve to form a tight shrink fit therearound.

10. The method as defined in claim 9, wherein the said liner sleeve is supported in axial alignment with, and opposite and adjacent an open end of the said bore in said engine block, for axial movement of said liner sleeve axially into said bore through the said open end thereof and into the said seated position therein immediately upon the said de-energizing of said induction heating coil and discontinuance of the said inductive heating of the wall of said bore by said coil.

11. The method as defined in claim 10, wherein a plurality of said liner sleeves disposed in a single row alignment and spaced relation are simultaneously assembled each into a respective one of a plurality of said bores disposed in a corresponding said single row alignment and spaced relation in said engine block by the simultaneous performance of the respective said method steps (a), (b), (c), and (d) with respect to each of said engine block bores and each of said liner sleeves.

12. The method as defined in claim 9, wherein an annular space is provided around the said induction heating coil and between the said coil and the said wall of said bore, when the said coil is positioned in its said heating position, for the accommodation within the said annular space and around the said coil of the said liner sleeve on the said axial insertion thereof into the said bore.

13. The method as defined in claim 12, wherein a plurality of said liner sleeves are simultaneously assembled each into a respective one of a plurality of said bores in said engine block by the simultaneous performance of the respective said method steps (a), (b), (c), and (d) with respect to each of said engine block bores and each of said liner sleeves.

14. The method as defined in claim 9, wherein a plurality of said liner sleeves are simultaneously assembled each into a respective one of a plurality of said bores in said engine block by the simultaneous performance of the respective said methods steps (a), (b), (c), and (d) with respect to each of said engine block bores and each of said liner sleeves.

15. The method of assembling a cylindrical metal liner sleeve into a cylindrical bore in an engine cylinder block of a metallic material having a coefficient of expansion greater than that of said liner sleeve, said method comprising the steps of:

(a) slidably fitting said liner sleeve over a free end of and onto an axially reciprocable mandrel of insulative material for axial sliding movement of said liner sleeve on said mandrel and off the said free end thereof, said mandrel having an induction heating coil mounted on and extending axially of the said free end of said mandrel and over which the said liner sleeve on said mandrel is slidable;

(b) positioning the said engine block with the said bore thereof in axial alignment with said mandrel, and with an open end of said bore disposed opposite the said free end of said mandrel and the said coil thereon;

(c) axially moving said coil into the said bore, by axial movement of the said reciprocable mandrel, to locate the coil in position within the bore for inductive heating of the wall thereof;

(d) energizing the said positioned coil to inductively heat the wall of said bore to a predetermined elevated temperature to circumferentially expand the said bore wall to a diameter sufficient to slidably receive the said liner sleeve axially therein with a snug sliding fit;

(e) de-energizing the said coil and immediately sliding the said liner sleeve off the said free end of said mandrel into the said bore, and over the said de-energized coil positioned therein, to a predetermined inserted position in the bore; and, (f) then maintaining said liner sleeve fixed in said inserted position in said bore until the heated wall thereof cools and circumferentially contracts at least sufficiently around said liner sleeve to form a tight shrink fit therearound.

16. The method as defined in claim 15, wherein a plurality of said liner sleeves are simultaneously assembled each into a respective one of a plurality of said bores in said engine block by the simultaneous performance of the respective said method steps (a), (b), (c), (d), (e) and (f) with respect to each of said engine block bores and each of said liner sleeves.

17. The method as defined in claim 15, wherein a plurality of said liner sleeves are slidably supported in single row laterally abreast alignment and are simultaneously assembled each into a respective one of a plurality of said bores disposed in a corresponding said single row laterally abreast alignment in said engine block by the simultaneous performance of the respective said method steps (a) to (f) inclusive with respect to each said engine block bores, each of said coils, and each of said liner sleeves.

18. The method of assembling an annular metal member having a center axis into an annular recess in an article formed of a metal having a coefficient of expansion greater than that of said member, said method comprising the steps of:

(a) inductively heating the annular wall of the said recess in said article to a predetermined elevated temperature, by energizing an induction heating coil disposed axially within, but spaced from the wall of said recess by an annular coupling gap, to circumferentially expand the said annular wall to a diameter sufficient to slidably receive the said annular member axially into the said recess with a snug sliding fit;

(b) de-energizing the said coil and immediately slidably inserting the said annular member axially into the said recess, and over the said de-energized coil positioned therein, to a predetermined inserted position in the recess; and, (c) then maintaining said annular member fixed in said inserted position in said recess until the heated wall of said recess cools and circumferentially contracts and shrink fits sufficiently around said annular member to form a tight interference fit therewith.

19. The method as defined in claim 18, wherein a plurality of said annular members are simultaneously assembled each into a respective one of a plurality of said annular recesses in said article by the simultaneous performance of the respective said method steps (a), (b), (c), and (d) with respect to each of said article recesses and each of said annular members.

20. The method as defined in claim 19, wherein the said article is constituted essentially of aluminum and the said annular members are constituted of hardened steel.

21. The method as defined in claim 18, wherein the said article is constituted essentially of aluminum and the said annular member is constituted of hardened steel.

22. Apparatus for assembling a cylindrical metal liner sleeve into a cylinder bore in an engine cylinder block comprising: an axially reciprocable cylindrical slide mandrel of insulative material cantilever supported at one end and having an inductor coil axially extending over its free other end and fixedly mounted thereon, said mandrel adapted to axially receive the said liner sleeve over the said coil for slidable positioning on an axially extending slide portion of said mandrel located inwardly thereof from its said coil-enclosed free end; actuating means for axially moving said mandrel in a direction to insert the said coil thereon through an open end of an into inductive heating position within a said engine block bore located in axial alignment with said mandrel opposite the said free end thereof; a high frequency power supply for energizing the said coil, on insertion into said bore, to inductively heat the wall thereof to a predetermined elevated temperature; and reciprocable shuttle means movable axially relative to said mandrel, immediately on de-energization of said coil, to engage and slide the said liner sleeve on said mandrel toward and over the said free end thereof and over and around the de-energized said coil thereon, to axially insert the sleeve into the said bore to a predetermined axial inserted position therein.

23. Apparatus as defined in claim 22 for simultaneously assembling a plurality of said metal liner sleeves each into a respective one of a corresponding plurality of rowaligned said cylinder bores in said engine cylinder block, wherein a group of said axially reciprocable slide mandrels corresponding in number to the said bores in said engine block are cantilever supported at one end in side-by-side row alignment on a slide head assembly with their respective axes in the same spaced apart parallel relation as the parallel axes of the said bores in said engine block, and the said actuating means axially moves said group of mandrels in unison to simultaneously insert the said coils thereon each through an open end of, and into inductive heating position within a respective one of the said bores located in the engine block in axial alignment with respective ones of the said mandrels in the said group thereof, said high frequency power supply simultaneously energizing the said coils on said group of mandrels to inductively heat each of the said bores approximately to the said predetermined elevated temperature on the said simultaneous insertion of said coils into the respective said bores, and the said shuttle means engaging and sliding the said liner sleeves on said mandrels in unison, immediately on de-energization of said coils, to directly insert the said liner sleeves axially into respective ones of the said bores to the same predetermined axial inserted position.

24. Apparatus as specified in claim 23 and additionally comprising a slide track on which the said engine block is adapted to be slidably mounted for sliding movement in a direction perpendicular to the respective axes of, and in a plane parallel to the common axial plane of the said plurality of slide mandrels, with the open ends of the said rowaligned plurality of bores in said engine block facing in a direction toward the said free ends of the respective said mandrels, and with the axes of the said bores extending parallel to each other and to the said mandrels and disposed in the plane of said mandrels so as to permit positioning of the said engine block along the said slide track with the axes of the said bores in exact axial coincidence with respective ones of the said group of mandrels for axial insertion of the said liner sleeves on said mandrels into the said bores.

25. Apparatus as defined in claim 23, wherein the said shuttle means comprises a metal drive plate member common to the said group of slide mandrels and provided with a plurality of row aligned circular apertures for receiving respective ones of said mandrels therethrough, said drive plate member being slidable on said slide mandrels to engage and slidably move the said liner sleeves thereon simultaneously over the respective said inductor coils on the free ends of the mandrels and into the respective said engine block bores, and operating means comprising secondary hydraulic power cylinder means mounted on said slide head assembly and operatively connected to said drive plate member to reciprocate the same.

26. Apparatus as defined in claim 25, wherein the said drive plate member of said shuttle means engages the trailing rear rim end of each of the said liner sleeves on said group of mandrels and furthest from the free ends thereof, with an interfacing surface engagement around said rear rim ends, to effect the axial insertion of the said liner sleeves simultaneously into the respective bores of said engine block, and the said drive plate member is maintained in said interfacing surface engagement with the railing rear rim end of the respective said liner sleeves by the said operating means, after the axial insertion of the liner sleeves into the said bores, to act as a heat sink means for extracting heat from the said trailing rear rim end of the respective liner sleeves and from the outer end portion of the respective bore walls engaged therewith and located at the said open end of the respective bores.

27. Apparatus as defined in claim 23, wherein the said slide mandrels are each provided with external guide track means over and on which the said liner sleeves are respectively slideably received to concentrically position and support them on the respective said mandrels for sliding movement axially thereof, said guide track means on each said mandrel comprising a plurality of elongated, parallel, slide rails extending longitudinally of, and fixedly secured to and projecting radially outward from the outer side of the said slide portion of the mandrel, in widely spaced apart relation circumferentially about the mandrel, for engagement with the interior wall of the respective liner sleeve thereon.

28. Apparatus as defined in claim 27, wherein the said slide mandrels are each also provided with external spring loaded retainer means on their outer sides for resiliently gripping the interior of the said liner sleeves on sliding placement over the respective mandrels to their loading positions thereon, to thereby yieldingly retain the liner sleeves in place in their loading position on said mandrels.

29. Apparatus as defined in claim 28, wherein the said retainer means on each of said slide mandrels comprises a plurality of elongated, parallel, gripper bar members extending longitudinally of, and projecting radially outwardly of the respective slide mandrel from the outer side of the said slide portion thereof, in widely spaced apart relation circumferentially about the respective mandrel, and spring loaded in a direction radially outwardly of the respective mandrel to a restrained maximum distance slightly greater than the inside radius of said liner sleeves.

30. Apparatus as set forth in claim 22 and additionally comprising a slide track on which the said engine block is adapted to be slidably mounted for sliding movement in a direction perpendicular to the said slide mandrel, with the open end of the said bore facing in a direction toward the said free end of said mandrel and with the axis of the said bore extending parallel to said mandrel and disposed in the plane of said mandrel that extends parallel to the said slide track so as to permit positioning of the said engine block along the said slide track with the axis of the said bore in exact axial coincidence with said mandrel for axial insertion of the said liner sleeve thereon into said bore.

31. Apparatus as defined in claim 22, wherein the said slide mandrel is supported for axially reciprocable slide movement on a machine tool base slide.

32. Apparatus as defined in claim 22, wherein the said slide mandrel is cantilever supported at said one end on a slide head assembly mounted for reciprocable slide movement parallel to the axis of said mandrel on a machine tool base slide.

33. Apparatus as defined in claim 32, wherein the said slide head assembly includes a high frequency power supply work station carried by said slide head, and the said slide mandrel is cantilever supported at said one end on said work station.

34. Apparatus as defined in claim 32, wherein the said actuating means for said axially reciprocable slide mandrel comprises primary hydraulic power cylinder means mounted on a bed member of said machine tool base slide and operatively connected to said slide head assembly.

35. Apparatus as defined in claim 32, wherein the said slide head assembly is reciprocated by said actuating means which, in turn, reciprocates the said slide mandrel.

36. Apparatus as defined in claim 22, wherein the said shuttle means comprises a metal drive plate member having a mandrel receiving aperture, said drive plate member encircling and being slidable on said slide mandrel to engage and slidably move the said liner sleeve thereon over the said inductor coil on the free end of the mandrel and into the said engine block bore, and operating means comprising secondary hydraulic power cylinder means mounted on said slide head assembly and operatively connected to said drive plate member to reciprocate the same.

37. Apparatus as defined in claim 36, wherein the said drive plate member of said shuttle means engages the trailing rear rim end of the said liner sleeve on said mandrel and furthest from the free end thereof, with an interfacing surface engagement around said rear rim end, to effect the axial insertion of the said liner sleeve into the said bore of said engine block, and the said drive plate member is maintained in said interfacing surface engagement with the trailing rear rim end of the liner sleeve located at the said open end of the bore by the said operating means, after the axial insertion of the liner sleeve into the said bore, to act as a heat sink means for extracting heat from the said trailing rear rim end of the liner sleeve and from the outer end portion of the bore wall located at the said open end of said bore.

38. Apparatus as defined in claim 22, wherein the said slide mandrel is provided with external locator guide track means over and on which the said liner sleeve is slidably received to concentrically position and support it on said mandrel for sliding movement axially thereon, said guide track means comprising a plurality of elongated, parallel, slide rails extending longitudinally of, and fixedly secured to and projecting radially outward from the outer side of the said slide portion of said mandrel, in widely spaced apart relation circumferentially about the mandrel, for engagement with the interior wall of the liner sleeve.

39. Apparatus as defined in claim 38, wherein the said slide mandrel is also provided with external spring loaded retainer means on its outer side for resiliently engaging the said liner sleeve, on sliding placement over the mandrel to its loading position thereon, to thereby yieldingly retain the liner sleeve in its said loaded position on said mandrel.

40. Apparatus as defined in claim 39, wherein the said retainer means comprises a plurality of elongated, parallel gripper bar members extending longitudinally of, and projecting radially outwardly of the slide mandrel from the outer side of the said slide portion thereof, in widely spaced apart relation circumferentially about the mandrel, and spring loaded in a direction radially outwardly of said mandrel to a restrained maximum distance slightly greater than the inside radius of said liner sleeve.

41. An inductor for inductively heating the wall of, and supporting an annular metallic liner member in position for insertion axially into and shrink fitting into, an annular recess in an engine cylinder head, said inductor comprising a tubular, electrically insulative, mandrel of generally cylindrical form with a center axis and having an axially extending rearward slide portion and a reduced diameter, axially aextending forward terminal end portion, an induction heating coil concentrically mounted on and positioned over the said forward end portion of said mandrel and over which the said annular liner member is slidable for positioning on the said rearward slide portion of the mandrel, and external locator guide track means on said mandrel slide portion extending longitudinally of the mandrel and over and on which the said liner member is slidably received to concentrically position and support it on said mandrel for sliding movement axially thereof.

42. An inductor as defined in claim 41, wherein the said guide track means comprises a plurality of elongated, parallel, slide rails extending longitudinally of, and fixedly secured to and projecting radially outwardly from the outer side of the said slide portion of said mandrel, in widely spaced apart relation circumferentially about the mandrel, for engagement with the interior wall of the annular liner member.

43. An inductor as defined in claim 42, wherein the said mandrel is provided with external spring loaded retainer means on the outer side of the said mandrel slide portion for resiliently engaging and yieldingly retaining in place on said mandrel slide portion a said liner member positioned thereon.

44. An inductor as defined in claim 43, wherein the said retainer means comprises a plurality of elongated, parallel, gripper bar members extending longitudinally of, and projecting radially outwardly of the mandrel from the outer side of the said slide portion thereof, in widely spaced apart relation circumferentially about the mandrel and respectively located between different pairs of said slide rails, and spring loaded in a direction radially outwardly of said mandrel to a predetermined limited distance to resiliently grip the interior of said liner member.

45. An inductor as defined in claim 41, wherein the said mandrel is provided with external spring loaded retainer means on the outer side of the said mandrel slide portion for resiliently engaging and yieldingly retaining in place on said mandrel slide portion, a said liner member positioned thereover.

46. An inductor as defined in claim 45, wherein the said retainer means comprises a plurality of elongated, parallel, gripper bar members extending longitudinally of, and projecting radially outwardly of the mandrel from the outer side of the said slide portion thereof, in widely spaced apart relation circumferentially about the mandrel and respectively located between different pairs of said slide rails, and spring loaded in a direction radially outwardly of said mandrel to a predetermined limited distance to resiliently grip the interior of said liner member.

47. An inductor for inductively heating the wall of, and supporting an annular metallic liner member in position for insertion axially into and shrink fitting into, an annular recess in an engine cylinder head, said inductor comprising a tubular, electrically insulative, mandrel of generally cylindrical form with a center axis and having an axially extending rearward slide portion and a reduced diameter, axially extending, forward terminal end portion, said rearward slide portion adapted to slidably receive thereover and concentrically support thereon a said liner member for sliding movement axially of the mandrel, an induction heating coil concentrically mounted on and positioned over the said forward end portion of said mandrel and over which the said liner member is slidable for positioning on the said rearward slide portion of the mandrel, and external spring loaded retainer means on the outer side of the said mandrel slide portion for resiliently engaging and yieldingly retaining in place on said mandrel slide portion a said liner member positioned thereover.

48. An inductor as defined in claim 47, wherein the said retainer means comprises a plurality of elongated, parallel, gripper bar members extending longitudinally of, and projecting radially outwardly of the mandrel from the outer side of the said slide portion thereof, in widely spaced apart relation circumferentially about the mandrel, and spring loaded in a direction radially outwardly of said mandrel to a predetermined limited distance to resiliently grip the interior of said liner member.

49. An inductor for inductively heating the wall of, and supporting an annular metallic liner member in position for insertion axially into and shrink fitting into, an annular recess in an engine cylinder head, said inductor comprising a tubular, electrically insulative, mandrel of generally cylindrical form with a cylindrical center passageway therethrough on a center axis and having an axially extending rearward slide portion for slidably receiving and supporting thereon a said annular liner member and also having a reduced diameter axially extending forward outer end portion, a multi-turn induction heating coil concentrically mounted on and positioned over the said forward outer end portion of said mandrel and over which the said annular liner member is slidable for positioning on the said rearward slide portion of the mandrel, said heating coil having an inward end coil turn and an outward end coil turn, and a pair of coaxial inner and outer tubular conductor leads extending axially through the said passageway of said mandrel in electrically insulated relation to one another and electrically connected to respective ends of said coil and to an electrical power supply for energizing the coil.

50. An inductor as defined in claim 49, wherein the said induction heating coil is formed of a hollow conductor with an interior passage in communication with the said passageways of said hollow conductor leads for circulation of liquid coolant through said conductors and coil.

51. An inductor as defined in claim 49, wherein the said inner conductor lead extends coaxially through said coil and is electrically connected to the said outward end coil turn thereof, and flux intensifier element means are disposed within the said coil around the said inner conductive lead and substantially completely fill the annular space within the coil between the multiple turns thereof and the said inner conductor lead extending coaxially therethrough.

* * * * *

UNITED STATES PATENT AND TRADEMARK OFFICE
CERTIFICATE OF CORRECTION

PATENT NO. : 4,849,594

DATED : July 18, 1989

INVENTOR(S) : Norbert R. Balzer

It is certified that error appears in the above-identified patent and that said Letters Patent is hereby corrected as shown below:

Column 4, line 11, "section" should read --- sectional ---. Column 5, line 52, "D" should read--- L ---. Column 6, line 2, "space" should read--- span ---. Column 7, line 55, "articles" should read--- particles---. Column 9, line 24, "side" should read---slide---. Column 10, line 67, "26" (second occurrence) should read--- 20 ---. Column 12, line 33, "yielding"should read --- yieldably ---. Column 13, line 40, after "method" insert --- according to the invention, the liner sleeves are ---; line 49, ", the" should read --- . The ---; line 65, "130" should read--- 30 ---; line 67, "130" should read--- 30 ---. Column 15, line 8, "Khz" should read--- kHz ---; line 30 (second occurrence) "sleeves" should read--- sleeve ---. Claim 17, line 9, after "each" (first occurence) insert--- of ---. Claim 22, line 13, "'an" should read--- and ---. Claim 23, line 4, "rowaligned" should read--- row-aligned ---. Claim 24, line 7, "rowaligned" should read--- row-aligned ---. Claim 26, line 10, "railing" should read--- trailing ---. Claim 27, line 4, "slideably"should read--- slidably---. Claim 41, line 8, "aextending" should read--- extending ---.

Signed and Sealed this

Twenty-first Day of January, 1992

Attest:

HARRY F. MANBECK, JR.

*Attesting Officer*     *Commissioner of Patents and Trademarks*